(12) United States Patent
Bavaresco

(10) Patent No.: US 6,357,825 B1
(45) Date of Patent: Mar. 19, 2002

(54) SADDLE FOR BICYCLES

(75) Inventor: Roberto José Bavaresco, Valdagno (IT)

(73) Assignee: DID Italia SRL, Valdagno (IT)

( * ) Notice: Subject to any disclaimer, the term of this patent is extended or adjusted under 35 U.S.C. 154(b) by 0 days.

(21) Appl. No.: 09/622,531

(22) PCT Filed: Feb. 18, 1999

(86) PCT No.: PCT/EP99/01069

§ 371 Date: Sep. 29, 2000

§ 102(e) Date: Sep. 29, 2000

(87) PCT Pub. No.: WO99/42353

PCT Pub. Date: Aug. 26, 1999

(30) Foreign Application Priority Data

Feb. 19, 1998 (IT) .......................................... VI98A0034

(51) Int. Cl.[7] .................................................. B62J 1/00
(52) U.S. Cl. ...................................................... 297/201
(58) Field of Search ............................ 297/195.1, 201, 297/202

(56) References Cited

U.S. PATENT DOCUMENTS

| 603,734 | A | * | 5/1898 | Peck et al. ................... 297/201 |
| 4,089,559 | A | | 5/1978 | Prange et al. |
| 4,387,925 | A | * | 6/1983 | Barker et al. ................ 297/201 |
| 4,451,086 | A | * | 5/1984 | Seven ..................... 297/201 X |
| 5,863,094 | A | * | 1/1999 | Endo ........................... 297/201 |

FOREIGN PATENT DOCUMENTS

| DE | 91361 | * | 4/1897 | ................. 297/201 |
| EP | 0 816 214 A | | 1/1998 | |

* cited by examiner

*Primary Examiner*—Peter R. Brown
(74) *Attorney, Agent, or Firm*—Dykema Gossett PLLC

(57) ABSTRACT

The invention realizes a saddle (1) for bicycles including two separate seats (2, 3) supported by a supporting unit (4) fixed to the bicycle frame. Each one of said seats (2, 3) includes at least a first part (2', 3'), fixed with respect to said supporting unit (4) and at least a second part (2", 3"), movable with respect to said first part (2', 3'). Said second part (2", 3") is revolvingly connected to a gudgeon (10, 11) defining an axis (10a, 11a) substantially horizontal placed substantially orthogonally to the advancement direction (6) of the bicycle.

11 Claims, 7 Drawing Sheets

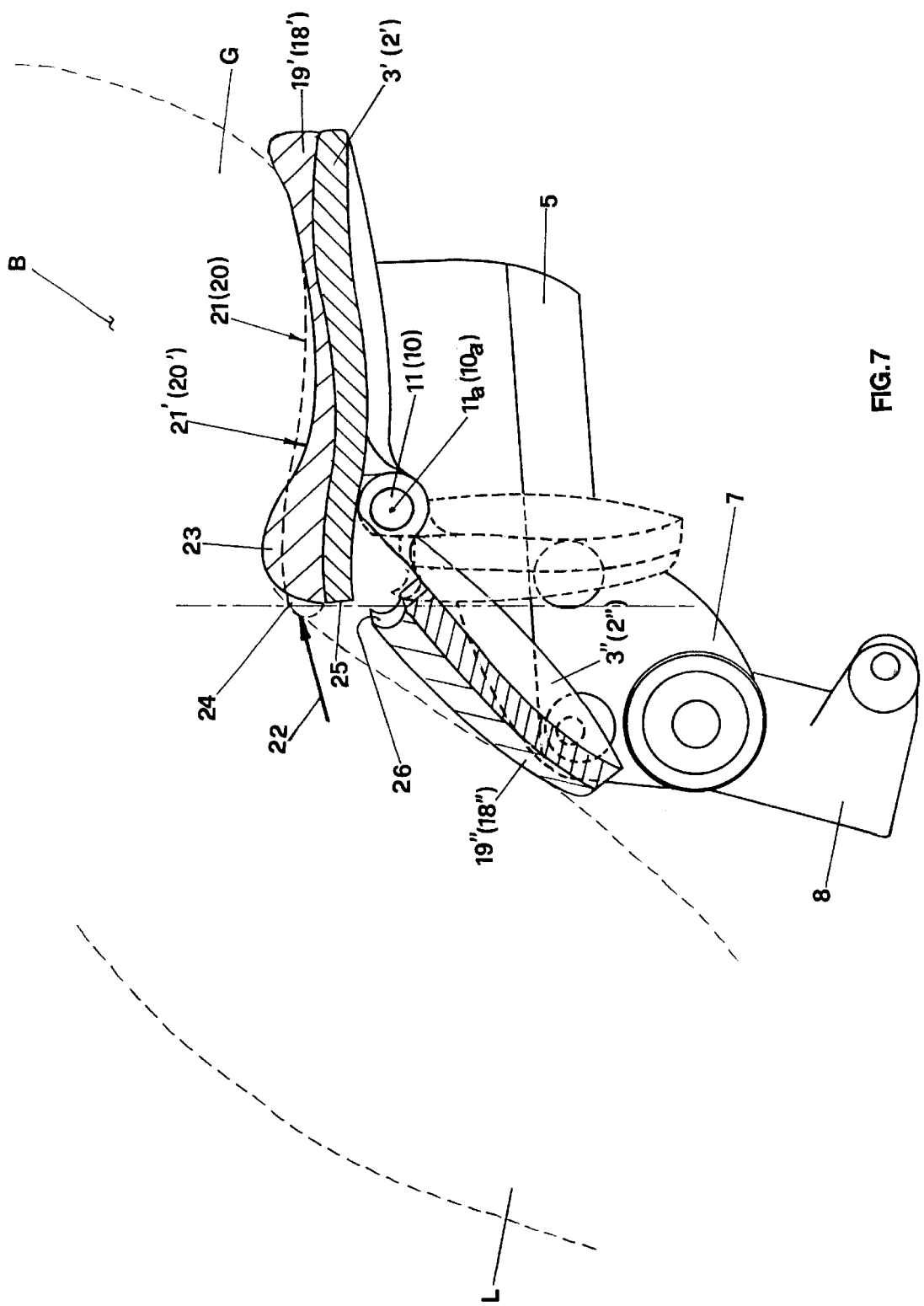

SADDLE FOR BICYCLES

The invention concerns a saddle for bicycles, particularly suitable to be used on sports and racing bicycles.

It is known that saddles for bicycles include a column coupled to the bicycle frame and supporting the supporting element of a seat on which the cyclist sits. In particular the seat has a modelled shape which is generally tapered in the front part which is housed in correspondence with the cyclist's groin.

The saddles for bicycles of the known described type are realized with different shapes according to whether the bicycle to which they are applied is a tourism bicycle or a sports bicycle or racing one.

All the saddles of the known type have, however, some known drawbacks. A first drawback is that the seat is fixed in its position and during the pedal stroke the cyclist's body, especially the thigh and the groin internal areas, carry out a rubbing against the seat surface. This contributes to make the sitting comfort worse, especially when the pedal stroke is particularly strong, for example during a climb cycling.

Another drawback is that the seat comfort degree is rather low because, since the support area in correspondence with the groin is limited, the specific pressure is enough to generate a discomfort and sometimes a pain too. This happens especially during sports competitions in which the sitting on the saddle is protracted for several hours and the pedal stroke is particularly powerful.

A further drawback is that the structural pattern of the seats does not help the ventilation in the area in contact with the cyclist's body. This causes an abundant sweating, especially in correspondence with the groin, bringing about tumefactions even serious and such that they can prevent the cyclist from using the bicycle even for a long time.

It is known that there are saddles for bicycles trying to overcome such known drawbacks, described in the European Patents No. 0.467.541/A1, 0.043.278/A2, 0.091.016/A2.

According to the above-mentioned patents teaching, the seat of the bicycle is divided in two independent parts, each one being connected to a horizontal rotating gudgeon coupled to a fixed supporting element connected to the bicycle frame.

The division of the seat saddle in two independent parts helps the ventilation and reduces the friction in correspondence with the groin, improving therefore tangibly the comfort with respect to the saddles of the known type.

Nevertheless it has been found that the seat revolving around an horizontal axis, whether it is realized in a single part or in two or several independent parts, does not gives to the cyclist a fixed reaction surface and reduces the power that the latter can transmit to the pedals, especially during a climb cycling.

It has also been found that using saddles with revolving seats following the buttocks moves, sometimes can cause troubles as traumata or back sprains, caused by the continuous lifting and lowering of the backbone.

That is why the use of saddles of the type described in the mentioned patents and generally of saddles having revolving seats is usually not recommended, particularly for those people suffering from backbone and back troubles.

Trying to overcome also these drawbacks, the U.S. Pat. No. 4.512.608 furnishes a saddle in which the seat is divided in two independent parts which are nevertheless fixed with respect to a supporting element connected to the bicycle frame and along which they can be adjusted in their position. The two parts in which the seat is divided are separate by a central element, connected as well to the same supporting element of the seat.

The saddles of the described type have a fixed seat and therefore do not cause any articular trouble to the cyclist's back and backbone. But the presence of the central element in the seat reduces the air circulation in correspondence with the groin and turns out to be an obstacle for a correct pedal stroke, especially a sports one.

The European Patent EP 0816214/A2 is also known, describing a saddle in which the seat has a back part fixed and connected to the frame, from which two protuberances project forward, parallel and pivoted on the seat fixed part. Each projecting part supports the lower part of the cyclist's thigh and follows it during the pedal stroke.

The fixed part of the seat is an effective opposing element for the cyclist's buttocks and therefore the legs thrust can be totally transmitted to the pedals while the cyclist's thigh is supported during the move by the swinging of the forward projecting parts.

The mentioned patent has also a different embodiment in which the seat is divided in two independent parts, both revolvingly coupled to an horizontal axis and each one consisting in several parts reciprocally hinged, such that they can follow the cyclist's leg movement during the pedal stroke.

But both the embodiments described in the mentioned patent have as well some drawbacks.

In particular the first mentioned embodiment has the drawback that, since the back part of the seat is realized in a single piece, the ventilation in correspondence of the buttocks is limited while the embodiment having the seat divided in two independent and revolving parts, presents the same problems previously mentioned concerning the saddles having revolving seats. All the saddles without the central element and in which the seat is divided in two independent parts have also the drawback of furnishing a weak anchorage to the cyclist's buttocks. The cyclist tends therefore, especially during the thrust on the pedals, to slide forward. So the efficacy of the pedal stroke and the stability of the driving position are compromised.

The present invention intends to overcome all the mentioned drawbacks and limitations.

A first aim is that the saddle of the invention has an anatomically-designed outline that, fitting the cyclist's buttocks outline, it allows the reduction of the specific pressure.

Another aim of the invention is that of realizing a saddle granting a safer support to the cyclists buttocks during the pedal stroke, with respect to the saddle of the known type.

A further and not the last aim of the invention is that the saddle of the invention, during the pedal stroke, does not bring any stress to the cyclist's backbone.

The said aims are achieved through the realization of a saddle for bicycles main features of which are to the first claim.

According to a preferred embodiment described hereinafter, the supporting unit correspondence with the points of contact.

In particular the anatomically-designed concave shape of the fixed parts covering of the saddle defines a depression in the covering just in correspondence with the area corresponding, on the vertical direction, to the point in which the head of the femur fits in the pelvis. An engagement is therefore obtained, preventing the sliding forward of the cyclist's pelvis, especially during the thrust on the pedals. This helps the transmission to the pedals of all the thrust carried out by the cyclist during the pedal stroke and is therefore particularly useful especially during a climb cycling.

Still advantageously the presence of the open area in correspondence with the groin reduces the rubbing and helps a better ventilation.

The said aims and advantages will be better underlined during the description of a preferred embodiment of the invention referring to the enclosed drawings where:

FIG. 7 shows the cross section of the respective position of the saddle and of the cyclist's leg at the end of the strain on the pedals.

Figure 1:
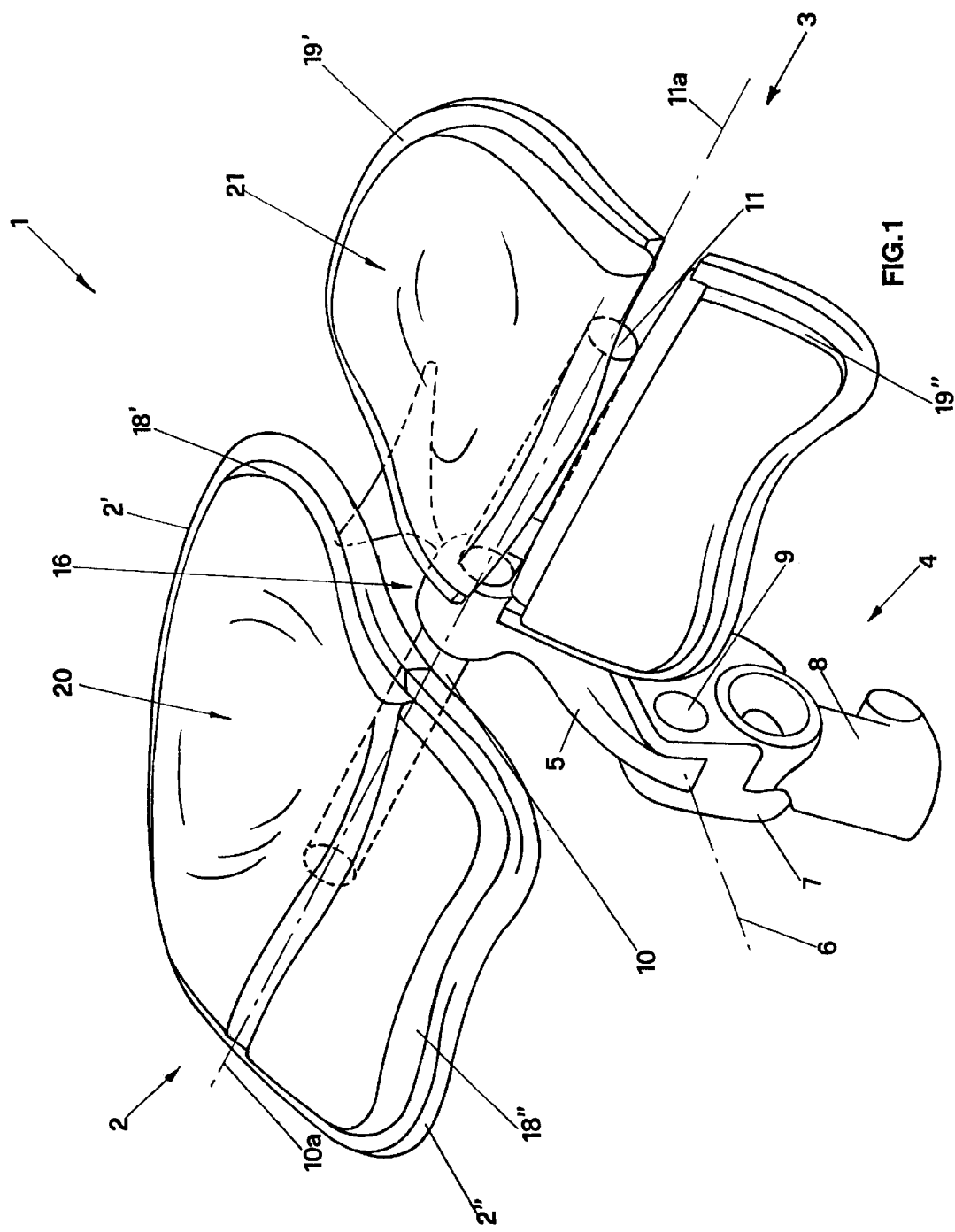
FIG. 1 shows the saddle of the invention in a top front perspective view.

As it can be observed in the FIGS. 1 to 5 the saddle of the invention, marked with 1 as a whole, includes a couple of seats 2, 3 on which the cyclist sits, which are supported by a supporting unit, marked with 4 as a whole connected to the bicycle frame.

The supporting unit 4 includes a slide 5 defining a longitudinal axis 6 coinciding with the advancement direction of the bicycle. Said slide is supported by an underlying counter-slide 7, the latter being supported by a column 8 connected to the bicycle frame.

The slide 5 is adjusted in its position with respect to the underlying counter-slide 7 making it slide along the longitudinal axis 6 according to the cyclist's needs and locking it in the wanted position through fixing means, for example screws or gudgeons 9.

According to the invention each one of said seats 2, 3 includes at least a first part 2', 3', fixed with respect to said supporting unit 4, and at least a second part 2", 3", movable with respect to said first part 2', 3', said second part 2", 3" being revolvingly connected to a gudgeon 10, 11 defining an axis 10a, 11a substantially horizontal placed substantially orthogonally to the advancement direction 6 of the bicycle.

In particular each gudgeon 10, 11 is fixed to the slide 5 and supports the first part 2', 3' of each seat 2, 3. Said first part is on its turn fixed to the gudgeon.

Figure 2:
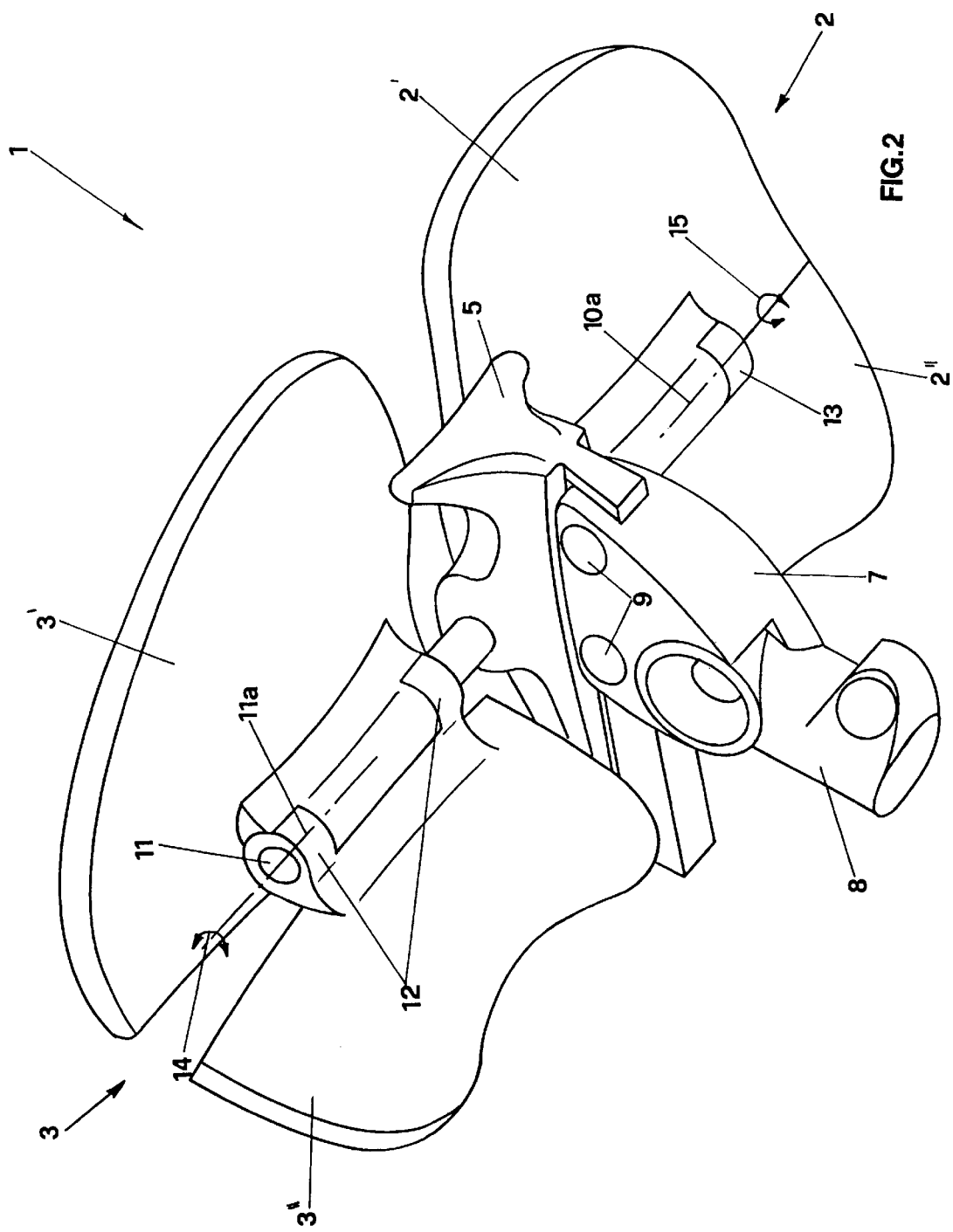
FIG. 2 shows the saddle of the invention in a rear perspective view from below.
Figure 3:
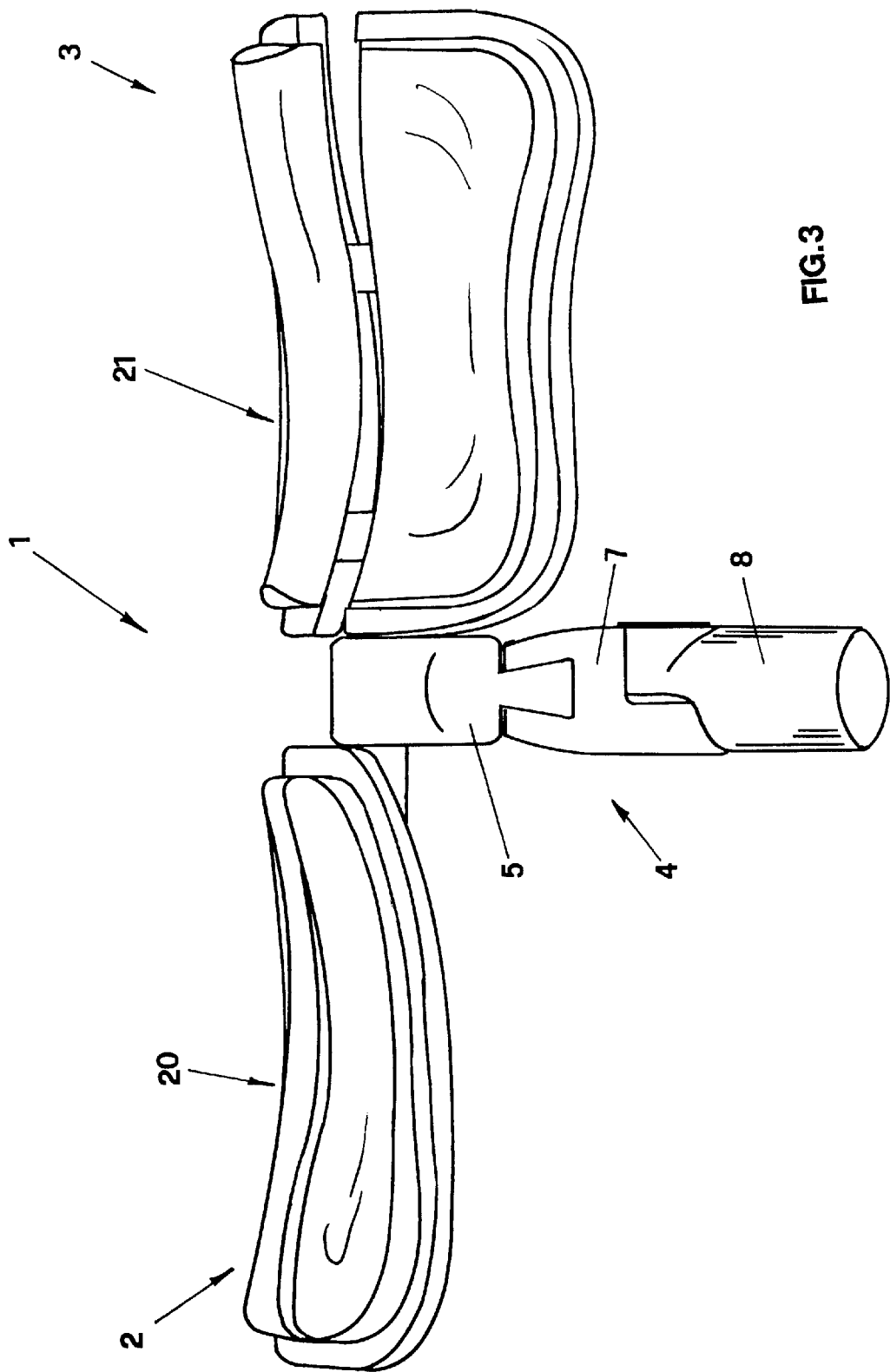
FIGS. 3, 4 and 5 show respectively the front, top and outline view of the saddle of the invention shown in FIG. 1.
Figure 4:
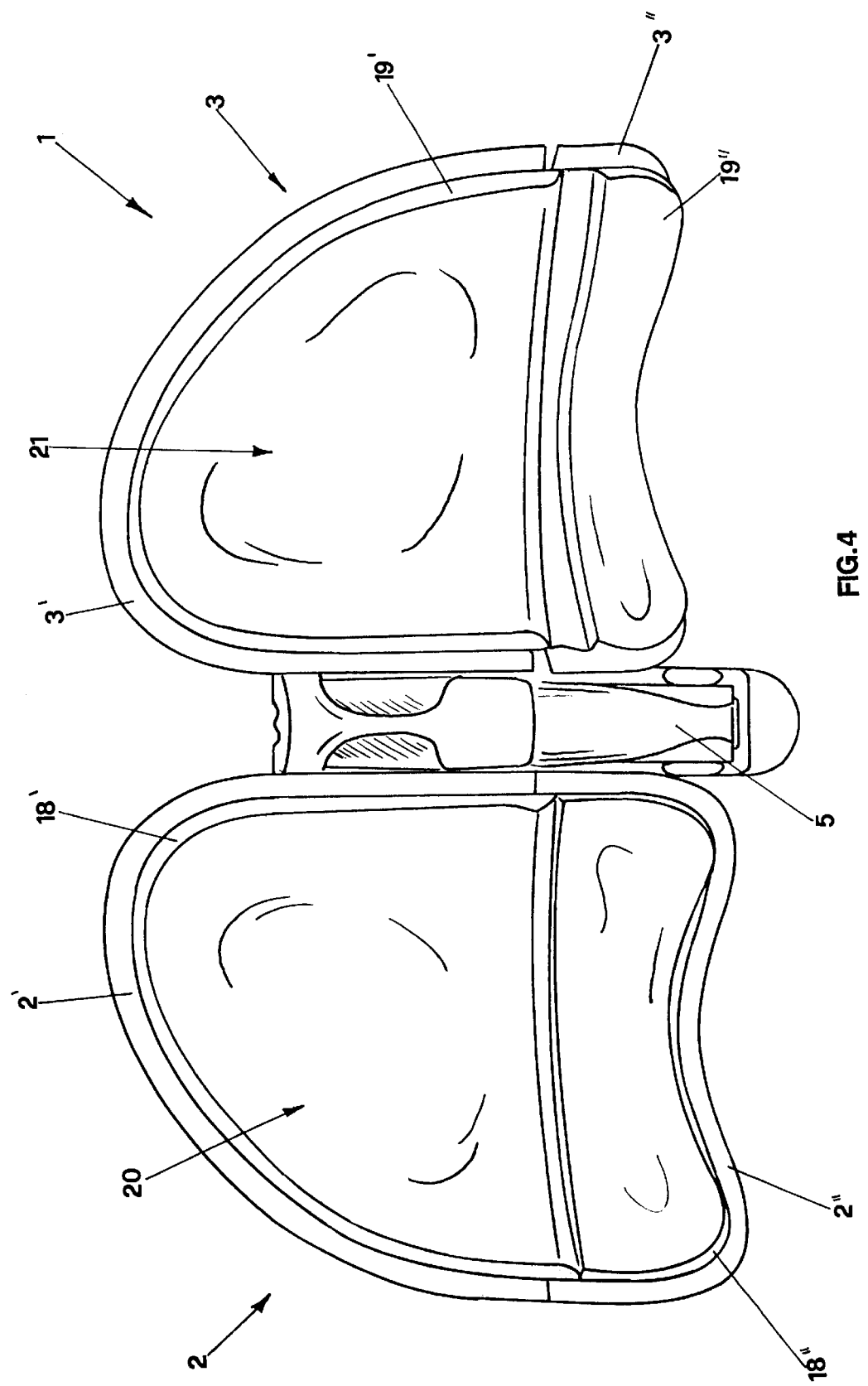
Figure 5:
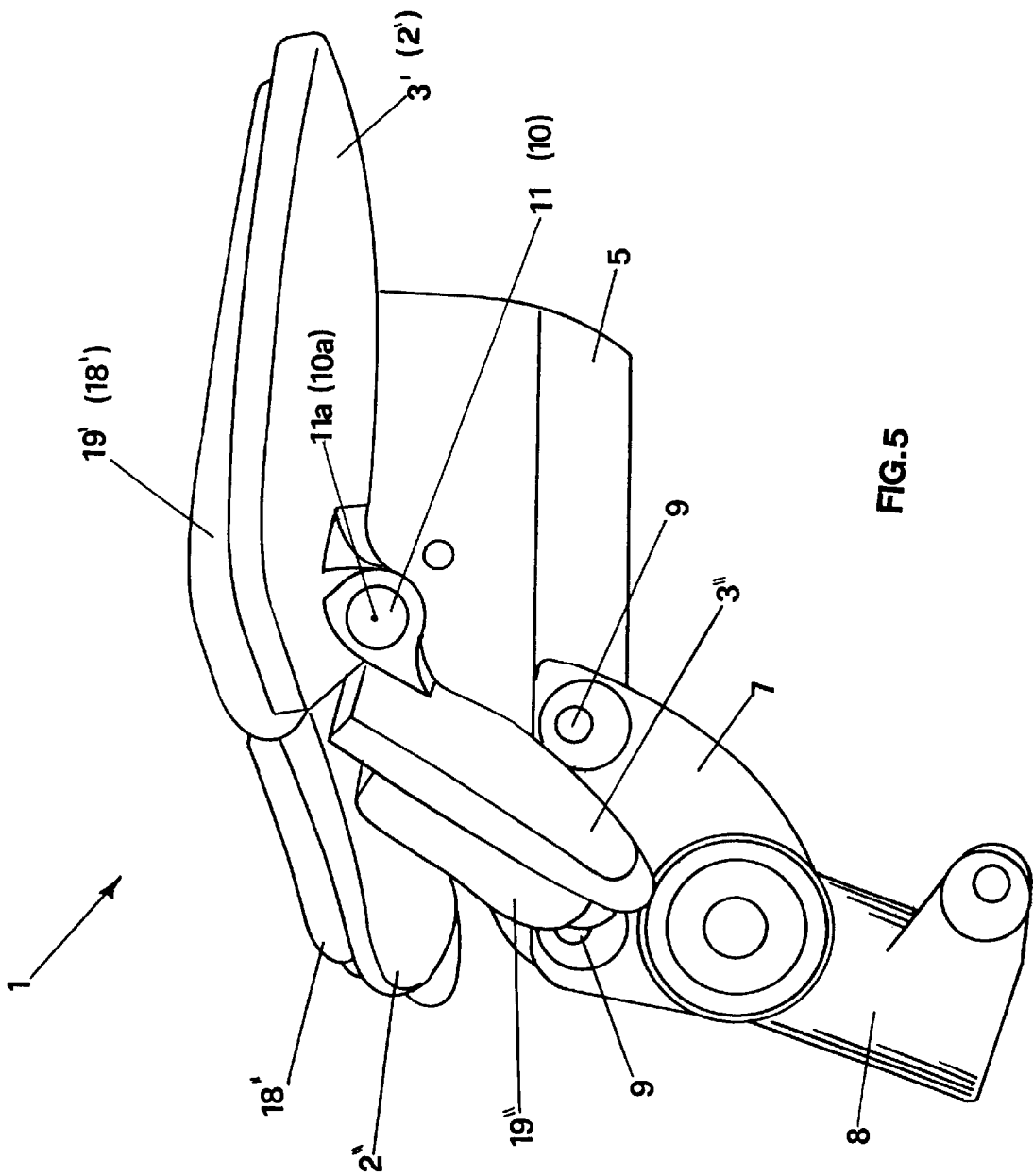

Moreover, as it can be observed in FIG. 2, each second part 2", 3" of each seat has revolving supports 12, 13 connecting it in a revolving way to the gudgeon 10, 11 in such a way that said each second part 2", 3" can rotate with respect to the respective first part 2', 3' and around the longitudinal axis 10a, 11a defined by each gudgeon 10, 11, according to both the directions shown by the arrows 14, 15.

The rotation of the second part 2", 3" of each seat is made elastic through the interposition of elastic means, not represented.

The area 16 separating the seats 2, 3 in correspondence with the slide 6, helps the ventilation and reduces the sweating.

It can be observed in the FIG. that each first part 2', 3' and each second part 2", 3" of the saddle are covered respectively by a first cushion 18', 19' and a second cushion 18", 19" realized in soft material, suitable to make the sitting softer and therefore more comfortable.

Figure 6:
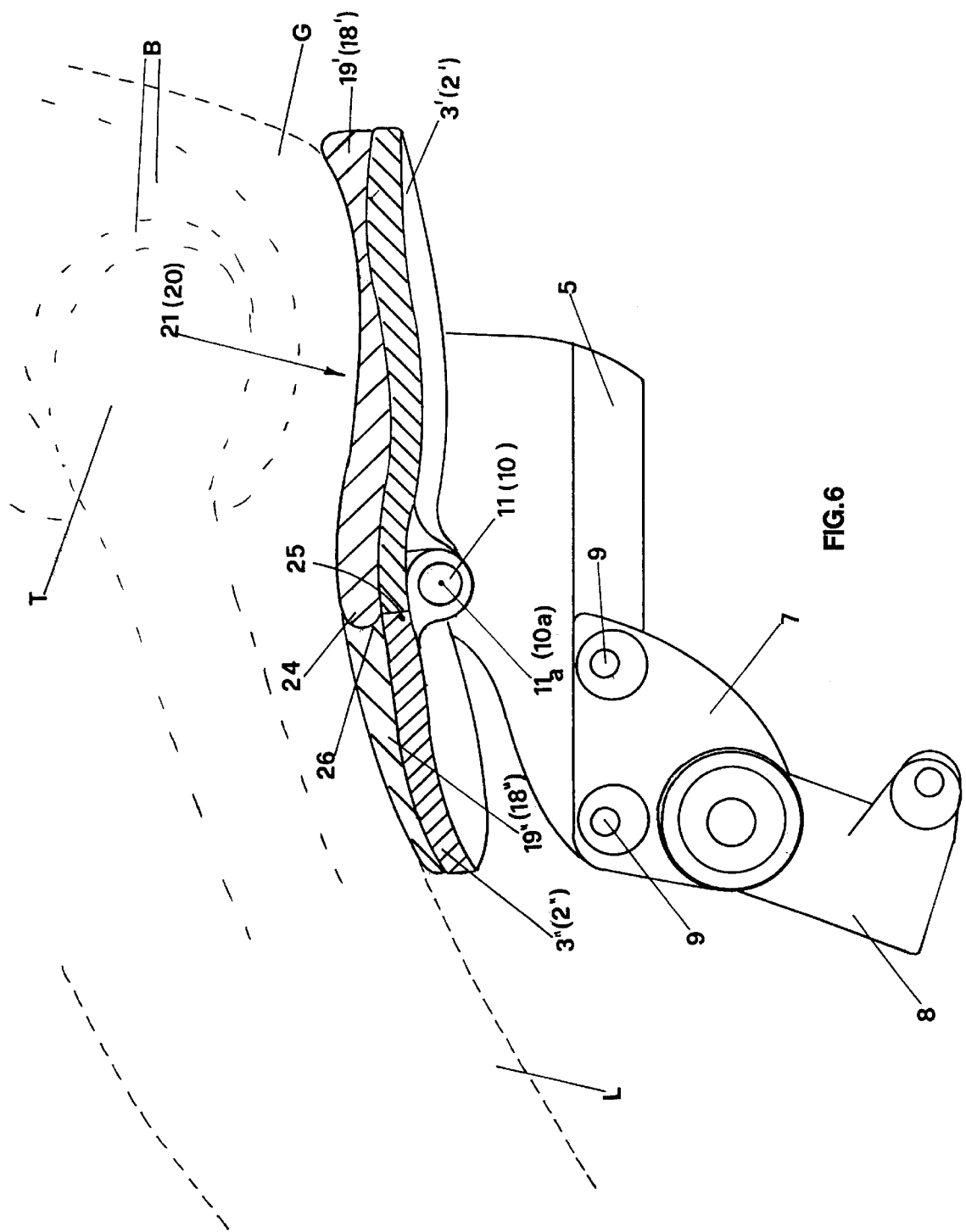
FIG. 6 shows the cross section of the respective position of the cyclist's body with respect to the saddle at the beginning of the strain on the pedals.

In particular the first cushion 18', 19', covering each first fixed part 2", 3", has a depression 20, 21 particularly visible in FIGS. 6 and 7, suitable to house the cyclist's buttocks G.

The depression 20, 21 is realized just in correspondence of the area in which, on the saddle, the insertion point of the head of the femur F of the cyclist's leg L is projected in the pelvis B.

In such a way an engagement is obtained, preventing the sliding forward of the cyclist's pelvis during the pedal stroke.

Each first cushion 18', 19', as it can be observed in FIG. 6, has a front projection 24 extending beyond the front edge 25 of the respective first part 2', 3' of the saddle supporting it. The front projection 24, moreover, is housed in a corresponding back recess 26 present in the second cushion 18", 19" covering each second part 2", 3" of the saddle.

When the cyclist's leg L is in the position that can be observed in FIG. 7 during the phase of the thrust application on the pedals, it carries out on the projecting part 24 of each first cushion 18', 19' a thrust according to the direction shown by the arrow 22. Said thrust draws back the projecting part 24 according to the same direction of the arrow 22. Since the first cushion 18', 19' is fixed to the first part 2', 3' of the saddle preferably through an adhesive and therefore it cannot be removed, the projecting part 24 draws back and at the same time lifts causing the swelling 23 widening the initial concavity of the depression 20, 21, changing it in the deeper depression 20', 21'.

The cyclist's buttocks G are therefore more embedded in the saddle and the swelling 23 acts as an obstacle such that it prevents the shifting forward of the cyclist's body during the application of the highest strain on the pedals.

It is important to underline that the second part 2", 3" of the saddle is not an obstacle for the cyclist's leg L during the application of the highest strain on the pedals. In fact said second part 2", 3", as it can be observed in FIG. 7, draws back during the rotation it, as it can be observed in FIG. 7, as far as reaching the position shown through a hatching. In such a position the second cushion 18", 19" covering the said second part 2", 3" is completely re-entered under the first part 2', 3' of the saddle.

According to what has been said it can be understood that the saddle of the invention achieves all the pre-set aims.

In the executive phase the saddle and all the parts forming it can take different shapes than the shown and described one and the used materials can be of various types according to the user's needs and according to the features that the builder wants for the saddle.

Even if the invention has been described referring to the figures shown in the enclosed drawings, it is clear that it will undergo several modifications and embodiments, all being a part of the inventive idea expressed in the enclosed claims.

What is claimed is:

1. A saddle for bicycles adapted to be secured to a bicycle frame including a supporting unit, two separate seats supported by the supporting unit and placed substantially symmetrically laterally to an advancement direction of the bicycle, each one of said seats including at least a first part fixed with respect to said supporting unit, and at least a second part being movable with respect to said first part, said second part being rotatably connected to a gudgeon defining a substantially horizontal axis substantially orthogonal to the advancement direction of the bicycle, said first part and said second part being covered with respective first and second cushions made in soft material, each first cushion having a depression adapted to be located in correspondence with an area in which an insertion point of the head of the femur of the cyclist's leg is projected in the pelvis, wherein each one of said first cushions has a projection extending forward with respect to a front edge of each first part of the saddle, said second cushions each having a recess for receiving and engaging the projection when the first part is rotated toward the second part, and the projection disengaging from the recess when the first part is rotated away from the second part therein.

2. A saddle for bicycles according to claim 1 wherein each first cushion has an upwardly projecting portion caused by deformation of the front projection during a pedal stroke.

3. The saddle according to claim 1 wherein each one of said cushions is fixed to the respective part of the saddle supporting it through connection means.

4. The saddle according to claim 1 wherein said supporting unit includes a slide to which said gudgeon is fixed, connected in a sliding way to a respective guide, the latter being supported by a column adapted to be housed in the bicycle frame.

5. The saddle according to claim 4 wherein said slide and said counter-slide define a longitudinal axis for the sliding of said seats coinciding with the advancement direction of the bicycle.

6. The saddle according to claim 1 wherein said gudgeon fixedly supports said first part of said saddle.

7. The saddle according to claim 1 wherein each second part includes a support to rotatably connect it to each respective gudgeon.

8. The saddle according to claim 1 wherein each second movable part is elastically coupled to the respective gudgeon.

9. A saddle for bicycles adapted to be secured to a bicycle frame including a supporting unit, two separate seats supported by the supporting unit fixed to the bicycle frame and placed substantially symmetrically laterally to an advancement direction of the bicycle, each one of said seats including at least a first part fixed with respect to said supporting unit, and at least a second part being movable with respect to said first part, said second part being rotatably connected to a gudgeon defining a substantially horizontal axis substantially orthogonal to the advancement direction of the bicycle, said first part and said second part being covered with respective first and second cushions made in soft material, each first cushion having a depression adapted to be located in correspondence with an area in which an insertion point of the head of the femur of the cyclist's leg is projected in the pelvis, wherein each one of said first cushions has a projection extending forward with respect to a front edge of each first part of the saddle, said second cushions each having a recess for receiving the front projection therein; and wherein each first cushion has an upwardly projecting portion caused by deformation of the front projection during a pedal stroke.

10. A saddle adapted to be secured to a bicycle frame comprising a pair of seats, a supporting unit having a lower end for connection to the frame and an upper portion and a supporting member secured to the upper portion extending laterally therefrom for supporting a seat on each lateral side of the frame, each of said seats includes a rearward portion fixedly secured to the upper portion and a forward portion rotatably secured to the upper portion, said forward and rearward portions being covered with a respective cushion, each of said first cushions having a front projection extending forwardly and each of said second cushions having a recess for receiving the projection when the forward portion engages the rearward portion and becoming disengaged when the forward portion is rotated away from the second portion.

11. The saddle according to claim 10, including a deformable portion adjacent the projection which becomes deformed when the forward portion rotates away from the rearward portion.

* * * * *